(12) United States Patent
Finlay, Sr. et al.

(10) Patent No.: US 7,164,564 B1
(45) Date of Patent: *Jan. 16, 2007

(54) SHORTED SCR LOCKOUT AND INDICATION

(75) Inventors: David A. Finlay, Sr., Marietta, NY (US); Kent Morgan, Groton, NY (US); Jeffrey C. Richards, Baldwinsville, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/128,513

(22) Filed: May 13, 2005

Related U.S. Application Data

(63) Continuation-in-part of application No. 10/884,304, filed on Jul. 2, 2004, now Pat. No. 7,133,266, which is a continuation of application No. 09/971,525, filed on Oct. 5, 2001, now Pat. No. 6,856,498.

(51) Int. Cl.
*H02H 9/68* (2006.01)
(52) U.S. Cl. .................................................. 361/42
(58) Field of Classification Search ................ 361/42, 361/45, 43
See application file for complete search history.

(56) References Cited

U.S. PATENT DOCUMENTS

| | | | |
|---|---|---|---|
| 3,654,515 A * | 4/1972 | Kato et al. ..................... 361/45 |
| 5,418,678 A * | 5/1995 | McDonald .................... 361/46 |
| 5,546,266 A | 8/1996 | Mackenzie et al. | |
| 5,600,524 A | 2/1997 | Neiger et al. | |
| 5,706,155 A | 1/1998 | Neiger et al. | |
| 5,715,125 A | 2/1998 | Neiger et al. | |
| 6,111,733 A | 8/2000 | Neiger et al. | |
| 6,226,161 B1 * | 5/2001 | Neiger et al. ................. 361/45 |
| 6,437,700 B1 * | 8/2002 | Herzfeld et al. ............ 340/650 |
| 6,522,510 B1 * | 2/2003 | Finlay et al. .................. 361/42 |
| 6,587,319 B1 * | 7/2003 | Finlay, Sr. .................... 361/42 |
| 6,590,753 B1 * | 7/2003 | Finlay ........................... 361/42 |
| 6,920,025 B1 * | 7/2005 | Nelson ......................... 361/42 |
| 6,952,150 B1 * | 10/2005 | Radosavljevic et al. ....... 335/18 |
| 6,980,005 B1 * | 12/2005 | Finlay et al. ............... 324/424 |
| 2004/0223279 A1 | 11/2004 | Bonilla et al. | |
| 2004/0252425 A1 | 12/2004 | Baldwin et al. | |

* cited by examiner

*Primary Examiner*—Stephen W. Jackson
*Assistant Examiner*—Boris Benenson
(74) *Attorney, Agent, or Firm*—Daniel P. Malley; Bond, Schoeneck & King, PLLC (57) ABSTRACT

The present invention is directed to a protective device that includes a plurality of line terminals and a plurality of load terminals. A fault detection circuit is coupled to the plurality of line terminals. The fault detection circuit is configured to provide a detection output signal in response to a detected condition. A switching device is coupled to the fault detection circuit. The switching device is configured to provide a trip signal in response to the detection output signal, the switching device being characterized by at least one device parameter. A circuit interrupting assembly is configured to electrically connect the plurality of line terminals and the plurality of load terminals in a reset state and disconnect the plurality of line terminals from the plurality of load terminals in response to the trip signal in a tripped state. An indicator circuit assembly is coupled to the switching device. The indicator circuit assembly is configured to generate a user-perceivable output signal based on the at least one device parameter.

32 Claims, 5 Drawing Sheets

SHORTED SCR LOCKOUT AND INDICATION

CROSS-REFERENCE TO RELATED APPLICATIONS

This is a continuation-in-part of U.S. patent application Ser. No. 10/884,304 filed on Jul. 2, 2004 now U.S. Pat. No. 7,133,266, which is a continuation of U.S. patent application Ser. No. 09/971,525 filed on Oct. 5, 2001, now U.S. Pat. No. 6,856,498, the contents of which are relied upon and incorporated herein by reference in their entirety, and the benefit of priority under 35 U.S.C. §120 is hereby claimed.

BACKGROUND OF THE INVENTION

1. Field of the Invention

The present invention relates generally to, and particularly to electrical wiring devices, and particularly to protective electrical wiring device.

2. Technical Background

AC power is provided to a house, building or other such facilities by coupling one or more breaker panels to an electrical distribution system, or another such source of AC power. The breaker panel distributes AC power to one or more branch electric circuits installed in the structure. The electric circuits typically include one or more receptacle outlets and may further transmit AC power to one or more electrically powered devices, commonly referred to in the art as load circuits. The receptacle outlets provide power to user-accessible loads that include a power cord and plug, with the plug being insertable into the receptacle outlet. Because certain types of faults have been known to occur in electrical wiring systems, each electric circuit typically employs one or more electric circuit protection devices. Electric circuit protective devices have been disposed within the breaker panel, receptacle outlets, plugs and the like.

Both receptacle wiring devices and electric circuit protective wiring devices in general, are disposed in an electrically non-conductive housing. The housing includes electrical terminals that are electrically insulated from each other. Line terminals couple the wiring device to conductors that provides electrical power from the electrical distribution system. Load terminals are coupled to wiring that directs AC power to one or more electrical loads. Those of ordinary skill in the pertinent art will understand that the term "load" refers to an appliance, a switch, or some other electrically powered device. Load terminals may also be referred to as "feed-through" terminals because the wires connected to these terminals may be coupled to a daisy-chained configuration of receptacles or switches. The load may ultimately be connected at the far end of the branch circuit.

Referring back to the device housing, the load terminals may be connected to an electrically conductive path that is also connected to a set of receptacle contacts. The receptacle contacts are in communication with receptacle openings disposed on the face of the housing. This arrangement allows a user to insert an appliance plug into the receptacle opening to thereby energize the device. A circuit interrupter disposed between the line terminals and the load terminals provides power to the load terminals under normal conditions, but breaks electrical connectivity when the protective device detects a fault condition in the load circuit.

There are several types of electric circuit protection devices readily available. Examples of such devices include ground fault circuit interrupters (GFCIs), ground-fault equipment protectors (GFEPs), and arc fault circuit interrupters (AFCIs). This list includes representative examples and is not meant to be exhaustive. Some devices include both GFCIs and AFCIs. As their names suggest, arc fault circuit interrupters (AFCIs), ground-fault equipment protectors (GFEPs) and ground fault circuit interrupters (GFCIs) perform different functions.

An arc fault typically manifests itself as a high frequency current signal. Accordingly, an AFCI may be configured to detect various high frequency signals and de-energize the electrical circuit in response thereto. A ground fault occurs when a current carrying (hot) conductor creates an unintended current path to ground. A differential current is created between the hot/neutral conductors because some of the current flowing in the circuit is diverted into the unintended current path. The unintended current path represents an electrical shock hazard. Ground faults, as well as arc faults, may also result in fire.

A "grounded neutral" is another type of ground fault. This type of fault may occur when the load neutral terminal, or a conductor connected to the load neutral terminal, becomes grounded. While this condition does not represent an immediate shock hazard, it may lead to serious hazard. As noted above, a GFCI will trip under normal conditions when the differential current is greater than or equal to approximately 6 mA. However, when the load neutral conductor is grounded the GFCI becomes de-sensitized because some of the return path current is diverted to ground. When this happens, it may take up to 30 mA of differential current before the GFCI trips. Therefore, if a double-fault condition occurs, i.e., if the user comes into contact with a hot conductor (the first fault) when simultaneously contacting a neutral conductor that has been grounded on the load side (the second fault), the user may experience serious injury or death.

Like all electrical devices, protective devices such as GFCIs, AFCIs, and other such devices have a limited life expectancy. When a protective device has reached end of life, the user may not be protected from the fault condition. End of life failure modes include device circuitry failure, circuit interrupter failure, relay solenoid failure, and/or solenoid switching device failure. Note that switching devices include thyristors such as the silicon controlled rectifier (SCR). For the sake of brevity, switching devices are hereinafter referred to as "SCRs."

Because end of life failure modes may result in the user being unprotected from the faults referred to above, test buttons have been incorporated into protective devices to provide the user with a means for testing the effectiveness of the device. One drawback to this approach lies in the fact that if the user fails to use the test button, the user will not know if the device is functional. Even if the test is performed, the test results may be ignored by the user for various reasons.

One of the failure modes listed above relates to the GFCI becoming inoperative when the SCR reaches end of life (shorts out). Some GFCI devices will continue to deliver power to the load circuit even though the device is non-protective. However, this approach leaves the user unprotected in the event of a fault condition.

In another approach that has been considered, a GFCI may be configured to trip the circuit interrupter in the event that the SCR shorts out. When the device trips out, the user will attempt to reset the device only to find that it immediately trips again. Consequently, the GFCI prevents power from being delivered to the load. However, this approach also has several drawbacks associated with it. It may be some time before the user realizes that the GFCI has tripped—the user only discovers that power is not available at the exact moment that power is needed for the user's application. In response, the user attempts to reset only to discover that the device trips out again in the manner described above. Subsequently, the user initiates a search for a receptacle that is still functional. The receptacle may be disposed in a different room requiring the user to employ an extension cord.

The trouble-shooting process may be further complicated by the GFCI's inability to differentiate between an internal fault (i.e., shorted SCR) and an external fault condition (i.e., a ground fault in the protected circuit). Accordingly, the GFCI may continue to trip in response to both conditions. This forces the user to guess. If the user assumes that power denial is due to a malfunctioning GFCI, the user will replace the GFCI with a new one only to discover that the GFCI was denying power in response to an external fault condition. The user then examines the branch circuit to determine the source of the fault condition. Trouble shooting by "trial and error" is costly, time-consuming, and a source of aggravation to the user.

What is needed is a protective device that denies power to the protected circuit when the device is non-protective. What is needed is a protective device that provides early indication to the user of power denial to the load circuit. What is needed is a protective device that helps trouble shoot the cause of a power denial to the load circuit.

SUMMARY OF THE INVENTION

The present invention is directed to a protective device that is configured to deny power to the load circuit when the device reaches end of life. The protective device of the present invention includes an indicator configured to emit a visual and/or audible indication when the device reaches end of life. Accordingly, the guess work associated with the trouble shooting process is eliminated.

One aspect of the present invention is directed to a protective device that includes a plurality of line terminals and a plurality of load terminals. A fault detection circuit is coupled to the plurality of line terminals. The fault detection circuit is configured to provide a detection output signal in response to a detected condition. A switching device is coupled to the fault detection circuit. The switching device is configured to provide a trip signal in response to the detection output signal, the switching device being characterized by at least one device parameter. A circuit interrupting assembly is configured to electrically connect the plurality of line terminals and the plurality of load terminals in a reset state and disconnect the plurality of line terminals from the plurality of load terminals in response to the trip signal in a tripped state. An indicator circuit assembly is coupled to the switching device. The indicator circuit assembly is configured to generate a user-perceivable output signal based on the at least one device parameter.

In another aspect, the present invention is directed to a protective device that includes a plurality of line terminals and a plurality of load terminals. A fault detection circuit is coupled to the plurality of line terminals. The fault detection circuit is configured to provide a detection output signal in response to a detected condition. A switching device is coupled to the fault detection circuit. The switching device is configured to provide a trip signal in response to the detection output signal, the switching device being characterized by at least one device parameter. A circuit interrupting assembly is configured to electrically connect the plurality of line terminals and the plurality of load terminals in a reset state and disconnect the plurality of line terminals from the plurality of load terminals in response to the trip signal in a tripped state. A protective circuit is coupled to the switching device and the circuit interrupting assembly. The protective circuit is configured to de-energize at least a portion of the circuit interrupting assembly in response to the trip signal. An indicator circuit assembly is coupled to the switching device. The indicator circuit assembly is configured to generate a user-perceivable output signal based on the at least one device parameter.

In yet another aspect, the present invention is directed to a protective device that includes a plurality of line terminals and a plurality of load terminals. A fault detection circuit is coupled to the plurality of line terminals. The fault detection circuit is configured to provide a detection output signal in response to a detected condition. A switching device is coupled to the fault detection circuit. The switching device is configured to provide a trip signal in response to the detection output signal, the switching device being characterized by at least one device parameter. A circuit interrupting assembly is configured to electrically connect the plurality of line terminals and the plurality of load terminals in a reset state and disconnect the plurality of line terminals from the plurality of load terminals in response to the trip signal in a tripped state. A monitoring circuit is coupled to the switching device. The monitoring circuit is configured to monitor the at least one device parameter and provide an end-of-life signal on the basis of the at least one device parameter. At least one indicator is coupled to the monitoring circuit. The indicator is configured to generate the user-perceivable output signal in response to the end-of-life signal.

In yet another aspect, the present invention is directed to a protective device that includes a plurality of line terminals and a plurality of load terminals. A fault detection circuit is coupled to the plurality of line terminals. The fault detection circuit is configured to provide a detection output signal in response to a detected condition. A switching device is coupled to the fault detection circuit. The switching device is configured to provide a trip signal in response to the detection output signal, the switching device being characterized by at least one device parameter. A circuit interrupting assembly is configured to electrically connect the plurality of line terminals and the plurality of load terminals in a reset state and disconnect the plurality of line terminals from the plurality of load terminals in response to the trip signal in a tripped state. A protective circuit is coupled to the switching device and the circuit interrupting assembly. The protective circuit is configured to de-energize at least a portion of the circuit interrupting assembly in response to the trip signal. A monitoring circuit is coupled to the switching device. The monitoring circuit is configured to monitor the at least one device parameter and provide an end-of-life signal on the basis of the at least one device parameter. At least one indicator is coupled to the monitoring circuit. The indicator is configured to generate the user-perceivable output signal in response to the end-of-life signal.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the protective device of the present invention is shown in FIG. 1, and is designated generally throughout by reference numeral 10.

Figure 1:
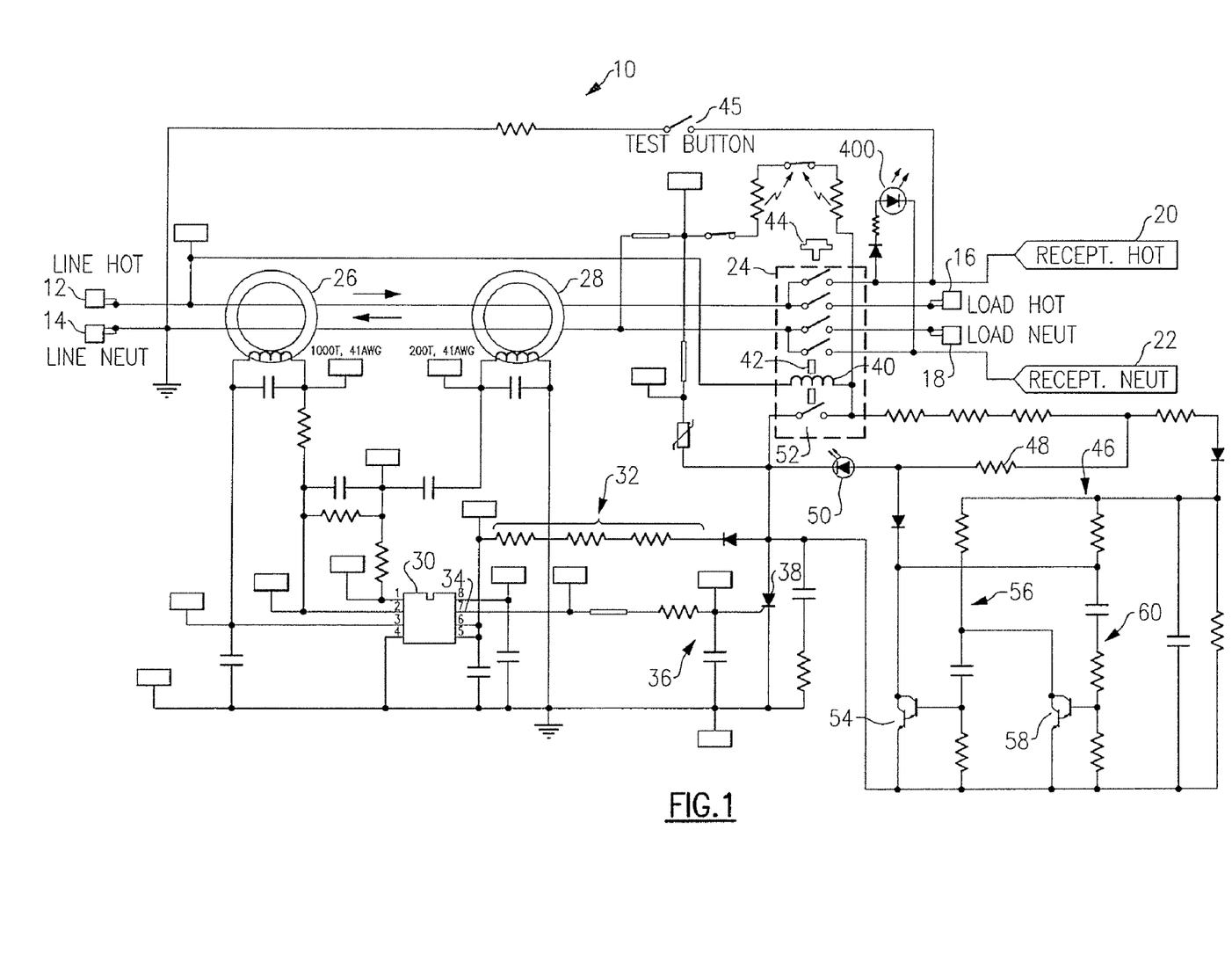
FIG. 1 is a ground fault circuit interrupter in accordance with one embodiment of the present invention.

As embodied herein, and depicted in FIG. 1, a protective device 10 in accordance with one embodiment of the present invention is disclosed. Device 10 typically includes a hot line terminal 12 and a neutral line terminal 14. Line terminals 12, 14 are coupled to sensor 26 and sensor 28 by way of a hot conductive path and a neutral conductive path. The conductive paths are coupled to circuit interrupter 24. Circuit interrupter 24 couples the line terminals 12, 14 to hot load terminal 16 and neutral load terminal 18, and hot receptacle load terminal 20 and neutral receptacle load terminal 22 when circuit interrupter 24 is in a reset state. Those of ordinary skill in the art will understand that load terminals 16, 18, may be connected to wires further coupled to a one or more downstream receptacles or switches in a daisy chain arrangement. Receptacle terminals 20, 22 are spatially configured to mate with an appliance plug connected by a power cord to an electrical appliance or a similar electrical load. Of course, circuit interrupter 24 disconnects the line terminals from both the load terminals 16, 18 and the receptacle load terminals 20, 22 in the tripped state. Note also that circuit interrupter 24 may be configured to disconnect one or more of the feed-through terminals 16, 18 from a corresponding receptacle terminal 20, 22.

Sensor 26 is a differential transformer which is configured to sense load-side ground faults. Sensor 28 is a grounded neutral transformer and is configured to produce a signal that becomes coupled to the differential transformer when there is a grounded-neutral fault condition. Transformers 26, 28 provide device 10 with the capability to sense both ground faults and grounded neutral fault conditions.

Differential transformer 26 and grounded-neutral transformer 28 are coupled to detector circuit 30. Power supply circuit 32 conditions AC power by supplying a DC V+ voltage for GFCI detector circuit 30. Detector 30 provides a fault detect output signal 34 in response to sensor inputs from transformer 26, 28. Output signal 34 is directed into filter circuit 36. The filtered output signal is provided to the control input of SCR 38. SCR 38 is turned ON to energize solenoid 40 when it is turned ON by the filtered output signal. Solenoid 40 drives trip mechanism 42 to open the interrupting contacts in circuit interrupter 24. To summarize, when a load side fault condition is sensed by differential transformer 26, circuit interrupter 24 disconnects the load side terminals 16, 18, 20, 22 from the line terminals 12, 14. At this point, device 10 is in the tripped state.

The trip solenoid 40 remains energized until device 10 enters the tripped state. When device 10 is in the tripped state, the opened contacts in circuit interrupter 24 removes the fault condition because the sensor output signal generated by transformer 26 is terminated by the interruption of the fault current. More expansively, when the transformer signal ceases, the detector output signal changes state turning SCR 38 OFF. Once SCR 38 is OFF, solenoid 40 de-energizes within a time period that is less than about 25 milliseconds. After the fault condition has been eliminated, reset button 44 may be employed to reset circuit interrupter 24.

Device 10 also is equipped with a test facility. In particular, when test button 45 is depressed by a user, a simulated fault condition is generated. The simulated fault condition is used to check the operative condition of GFCI 10. Circuit interrupter 24 will trip if the device is properly operating. Power may be restored to device 10 after a successful test by pressing reset button 44.

Various types of device status indicators may be included in GFCI 10, either alone or in combination. For example, device 10 may include a trip indicator, a pilot light, a reset indicator, and/or a "device properly wired" indicator. The trip indicator is configured to emit a signal when the circuit interrupter is tripped. The pilot light may be included to provide the user with a device location aide. The reset indicator, of course, provides a signal to the user indicating that the circuit interrupter is in the reset state. The line voltage indicator, i.e., the "device properly wired indicator," provides a signal that tells the user a source voltage has been connected to the device. The line voltage indicator may also tell the user that the line terminals are properly connected to the AC power source wiring (i.e., the wiring from the breaker panel is connected to the line terminals of the device). The indicators of the present invention may emit audible indications, visible indications, or both.

While FIG. 1 shows ground fault detection circuitry, the present invention is equally applicable to other types of protective devices. Those of ordinary skill in the art will recognize that substantially all of the various types of protective devices include similar components for sensing, detecting and interrupting the circuit in response to a particular fault condition. For example, the sensor in an AFCI is similar to transformer 26 but is typically configured to sense load current instead of differential current and/or line voltage. An AFCI sensor may include at least one of a toroidal transformer, shunt or voltage divider. Further, the detector in the AFCI may be implemented as an integrated circuit similar in form factor to the detector 30. The AFCI detector may also be configured to detect an arc fault condition on the basis of the frequency spectrum of the load current. Those of ordinary skill in the art will recognize that an arc fault may exhibit high frequency noise burst patterns. Once an arc fault condition has been detected, a signal is sent to an SCR and the device trips in the same, or similar, manner a GFCI trips.

All devices, including electrical devices have a finite operational life span. At the end of this operational life, the device experiences a fatal failure mode commonly referred to as an end-of-life condition. Certain end of life conditions may cause solenoid 40 to energize in the absence of a true fault condition. In another end-of-life mode solenoid 40 may be energized when circuit interrupter 24 is in a tripped state. For example, a permanent shorting out of the SCR, or a permanent malfunction that causes the SCR to permanently be turned ON, will cause solenoid 40 to remain energized for an extended period of time. Of course, solenoid 40 is configured to be energized only momentarily, and will burn out if it is energized for more than about 1 second. Once the solenoid burns out, the circuit interrupter is incapable of being tripped. Accordingly, the load terminals are permanently connected to the line terminals once device 10 is reset since the solenoid and SCR cannot respond to a fault condition.

An end of life indicator is included in device 10 to immediately alert the user to an end of life conditions. If the end-of-life condition results in power being denied, the denial of power condition will be immediately noticeable by the user because the indicator has emitted an indication. This feature allows the user to take remedial steps such that power will be available when power is required. The end of life indicator of the present invention alerts the user to the end of life condition by emitting a visual or audible indication, or both. The end-of-life indicator may be implemented as a device status indicator that provides a device status before and after an end-of-life condition. On the other hand, a device status signal and the end-of-life signal may be separately provided by device 10.

Referring back to FIG. 1, device 10 includes an end of life monitoring circuit 46. The output of end of life detection circuit 46 is coupled to trip indicator 50. The input of circuit 46 is connected in parallel with a current limiting resistor 48. Resistor 48, indicator 50 and SCR 38 are connected in series. Power supply 32 is connected in parallel with SCR 38. Indicator 50 is connected in parallel with auxiliary switch 52. Switch 52 is closed only when the circuit interrupter 24 is reset. When circuit interrupter 24 is operational and in the reset state, SCR 38 is OFF and auxiliary switch 52 is closed. Accordingly, current flows through the conductive path that includes the auxiliary switch 52 and indicator 50 is OFF.

When circuit interrupter 24 is operational but in the tripped state, SCR 38 is OFF and auxiliary switch 52 is open. Indicator 50 is ON because the current, which cannot flow through auxiliary switch 52, is flowing through indicator 50. Further, indicator 50 emits a steady signal because transistor 54 in circuit 46 is biased OFF. In particular, since SCR 38 is OFF, the voltage dividing action between resistor 48 and series pass resistance of power supply 32 limits the biasing voltage to a value that turns transistor switch 54 OFF.

When end of life occurs in detector 30 or in SCR 38 itself, SCR 38 is permanently ON, i.e., it is shorted. Those of ordinary skill in the art will recognize that a shorted condition represents a noticeable drop in the impedance value. Thus, the series pass resistance of power supply 32 is shunted by SCR 38. Accordingly, the voltage drop across resistor 48 increases such that transistor 54 begins to conduct. However, timing circuit 56 causes transistor 54 to conduct only for a predetermined time interval. When transistor 54 turns OFF, transistor 58 is biased to turn ON for a predetermined interval established by timing circuit 60. After which, the cycle repeats itself and transistor 54 is biased once again to turn ON. The cycling of transistor 54 causes indicator 50 to emit a cycling ON-OFF indicator signal. If indicator 50 is a visual indicator, a blinking light is emitted. If indicator 50 is an audible indicator, a beeping sound is emitted. The device impedance is only one device parameter that the present invention may be configured to monitor to detect an end-of-life condition. For example, the monitoring circuit employed by the present invention may also monitor the duration of the trip signal. If the trip signal is ON for an extended duration, this is another indication that the switching device has reached end of life.

It will be apparent to those of ordinary skill in the pertinent art that modifications and variations can be made to end of life indication circuit 46 of the present invention depending on cost and component selection criteria. For example, the cycling circuit may be implemented using oscillators, mutivibrators, relaxation oscillators, and other such circuits. Further, circuit 46 may be disposed in a processor, application specific integrated circuit (ASIC), or a field programmable gate array (FPGA) that employs the power line frequency of the AC source voltage source or on an internal clock to provide the cycling period and/or cycling pattern.

In sum, indicator 50 provides trip/reset state indication until protective device 10 reaches end of life. At that time, device 10 remains in a tripped state and indicator 50 provides a distinctive alternating ON-OFF end-of-life signal.

Another feature of the present invention relates to the fail-safe nature of the device 10. In particular, user actuation of reset button 44 will not result in the reset state if there is an end of life condition. Circuit interrupter 24 is configured to trip in response to SCR 38 being in a permanently conducting, or shorted, state. Further, circuit interrupter 24 will trip immediately each time the reset button 44 is actuated. This functionality is provided by a protective circuit that includes auxiliary switch 52. In the embodiment shown in FIG. 1, auxiliary switch 52 is disposed in series with solenoid 40. Switch 52 decouples solenoid 40 from the source of power when circuit interrupter 24 is in the tripped state. Each time the reset button 44 is actuated, auxiliary switch 52 performs two functions. First, it allows current to flow through solenoid 40, causing circuit interrupter 24 to trip. Auxiliary switch 52 is also opened in response to the tripping action. As a result, it prevents solenoid 40 from burning out. Thus, device 10 trips after each reset attempt. Thus, circuit interrupter 24 prevents AC power from being provided to the load circuit when the device offers no fault protection. The combination of the inability to reset and the cycling end of life indicator provides the user with a clear indication that the device is permanently defective. Those or ordinary skill in the art will recognize that other protective circuits that do not employ an auxiliary switch may be employed. For example, a protective circuit may implemented that employs a solid state switch instead.

In reference to the Background Section of the specification, one advantage of the end of life indicator 50 is that it helps the user determine whether the cause of power denial is a defective device (end of life condition) or a fault in the electrical distribution system. Power denial together with end of life indication informs the user that the device needs to be replaced. Power denial without an end of life indication informs the user that the device is operational. The user knows that there is a fault condition in the electrical distribution system that needs to be repaired. Accordingly, the end of life indicator helps the user trouble shoot and safely restore power to the load circuit.

The embodiment depicted in FIG. 1 also provides for more than one status indicator. In addition to trip indicator 50, device 10 includes a pilot indicator 400. Indicator 400 emits a signal when circuit interrupter 24 is reset and device 10 is operational, i.e., before an end of life condition has occurred. Indicator 50 may emit light when circuit interrupter 24 is tripped, before an end of life condition has occurred. However, indicator 50 provides a periodic signal when an end of life condition has occurred. The colors of light emitted by indicators 400, 50 are visually different from each other, such as green and red. Accordingly, protective device 10 emits a green color when reset, a red color when tripped, and a flashing red color after an end of life condition has occurred. Alternatively, indicator 400 may emit a visual indication whereas indicator 50 generates an audible indication.

Figure 2:
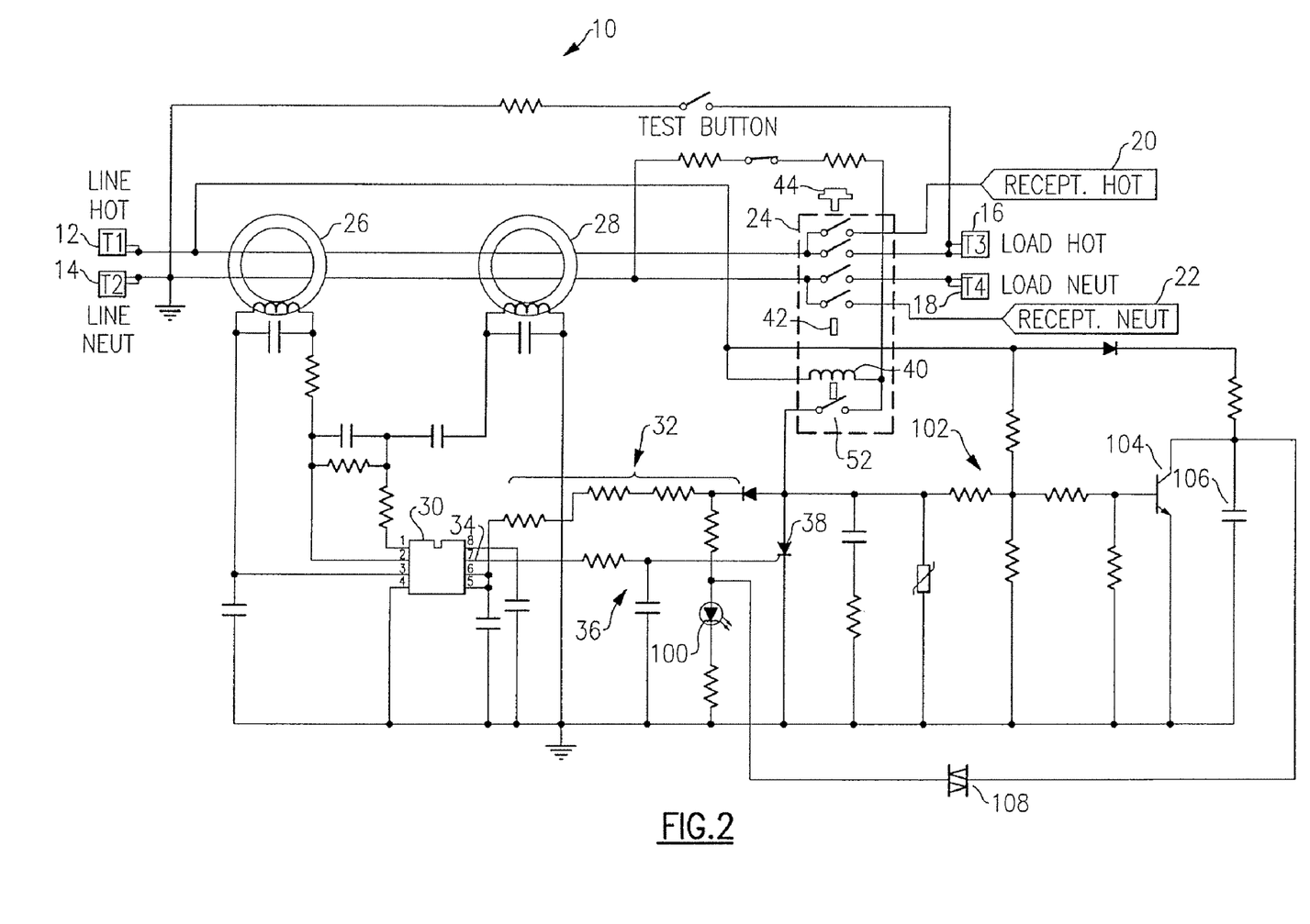
FIG. 2 is a schematic of a circuit protection device in accordance with another embodiment of the present invention.

As embodied herein and depicted in FIG. 2, a schematic of a circuit protection device 10 in accordance with another embodiment of the present invention is disclosed. The schematic in FIG. 2 is similar to FIG. 1 in that the sensing, detection, and tripping components are essentially identical. However, the embodiment of FIG. 2 also includes a pilot light indicator 100. Pilot light indicator 100 is connected to power supply circuit 32. As such, indicator 100 functions as a pilot indicator until such time as the protective device 10 has reached end of life. When end of life occurs, indicator 100 is configured to provide a cyclical blinking output. Again, any user actuation of the reset button 44 will not result in circuit interrupter 24 being reset. The embodiment of FIG. 2 operates as follows.

When device 10 is operational and circuit interrupter 24 in the reset state, SCR 38 is OFF and auxiliary switch 52 is closed. Indicator 100 is driven into the ON state. When circuit interrupter 24 is operational but in the tripped state, SCR 38 is OFF and the auxiliary switch 52 is open. Indicator 100 is OFF because the auxiliary switch 52 is open. Because the device is operational, there is no output signal from end of life circuit 102 to turn the indicator ON, so indicator 100 is steadily OFF. Thus, when the device is operational, indicator 100 provides a signal to the user indicating that power is present at the load terminals and is steadily OFF otherwise.

When there is an end of life condition, the circuit interrupter is tripped by SCR 38 and the auxiliary switch 52 is open. The input of circuit 102 is connected to SCR 38. When the SCR is permanently ON or shorted, transistor 104 is biased to turn OFF. This enables a capacitor 106 to charge to a voltage sufficient to turn diac 108 ON. Indicator 100 turns ON by way of diac 108 for a predetermined time interval that is determine by the discharging rate of capacitor 106. When capacitor 106 discharges to a predetermined voltage level, diac 108 turns OFF. Diac 108 turns OFF until capacitor 106 recharges. Once capacitor 106 is recharged, diac 108 is turned back ON. Accordingly, pilot indicator 100 provides a periodic output in response to the occurrence of an end of life condition.

Figure 3:
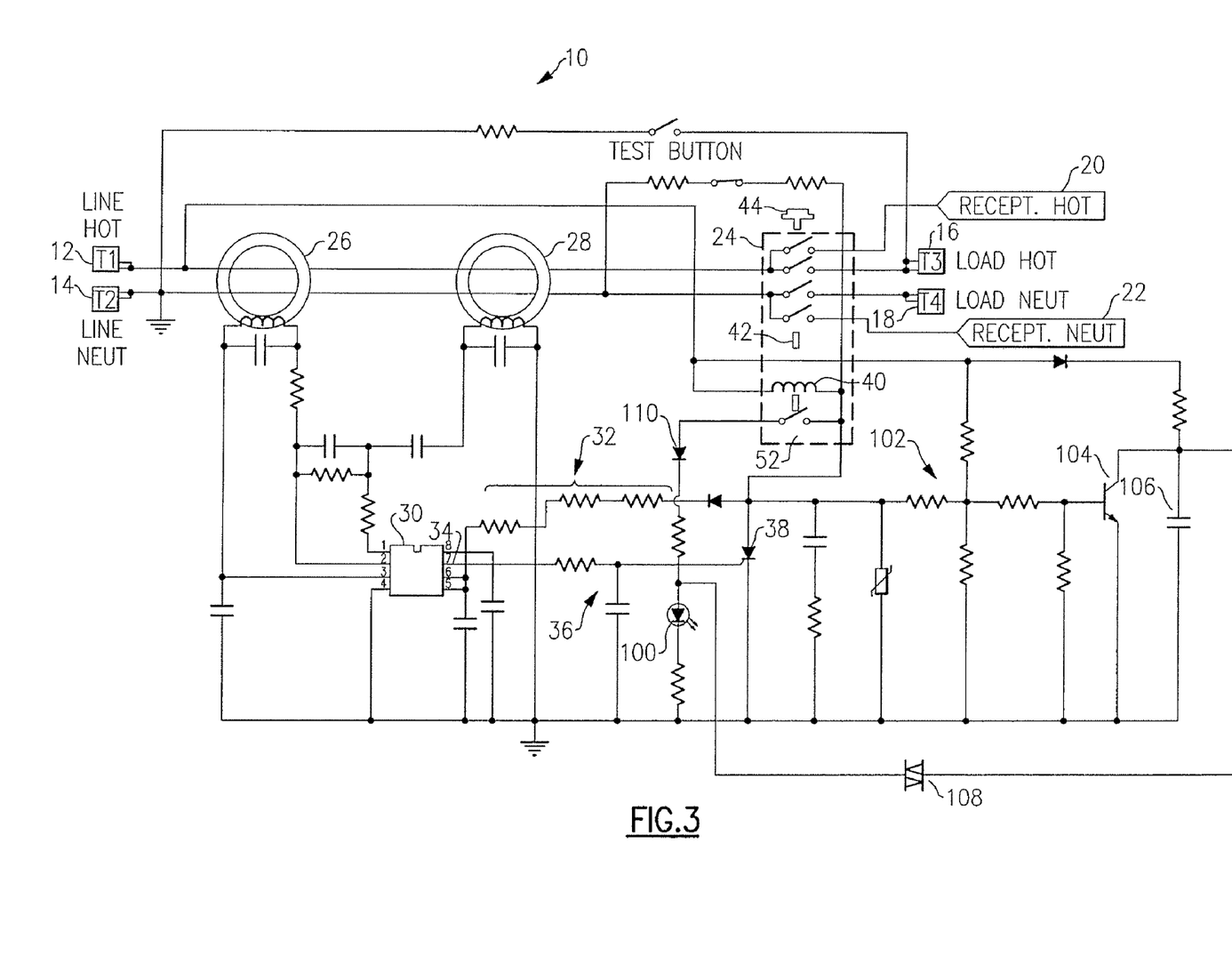
FIG. 3 is a schematic of a circuit protection device in accordance with another embodiment of the present invention.

Referring to FIG. 3, a schematic of a circuit protection device 10 in accordance with another embodiment of the present invention is disclosed. In this embodiment, auxiliary switch 52 is not disposed in series with SCR 38 and solenoid 40. When SCR 38 short circuits at end of life, auxiliary switch 52 does not serve to interrupt the flow of current through solenoid 40. Initially, solenoid 40 energizes to trip circuit interrupter 24 and the indicator 100 recycles on and off in the manner previously described. The user is made aware of the end of life condition by virtue of the device being in the tripped state and the periodic indication. Solenoid 40 will ultimately fail because of the current flow. After the solenoid burns out, the user may reset the device. While the device is configured to alert the user to the end of life condition, it also allows the user to restore power to the load circuit until the device is replaced. The rationale behind this option is to avoid the deployment of extension cords, or any unsafe means, to obtain power.

In an alternative embodiment, diode 110 is omitted. As a result, indicator 100 is continuously OFF until the end of life condition has occurred. When end of life occurs, indicator 100 emits a periodic signal to signal that device 10 is defective. Those of ordinary skill in the art will recognize that other types of status indicators may also be employed herein.

Referring to FIG. 3, if diac 108 is connected to a second indicator (not shown) instead of to indicator 100, indicator 100 would continue to perform as a pilot indicator. However, the second indicator would provide the periodic end of life signal. By using two indicators, device 10 may provide signals having visually contrasting colors, or a various mix of signal. For example, one indicator may provide a visual signal whereas the other may provide an audible signal. The use of two indicators may also be adapted to the circuits shown in FIG. 1 and/or FIG. 2.

Figure 4:
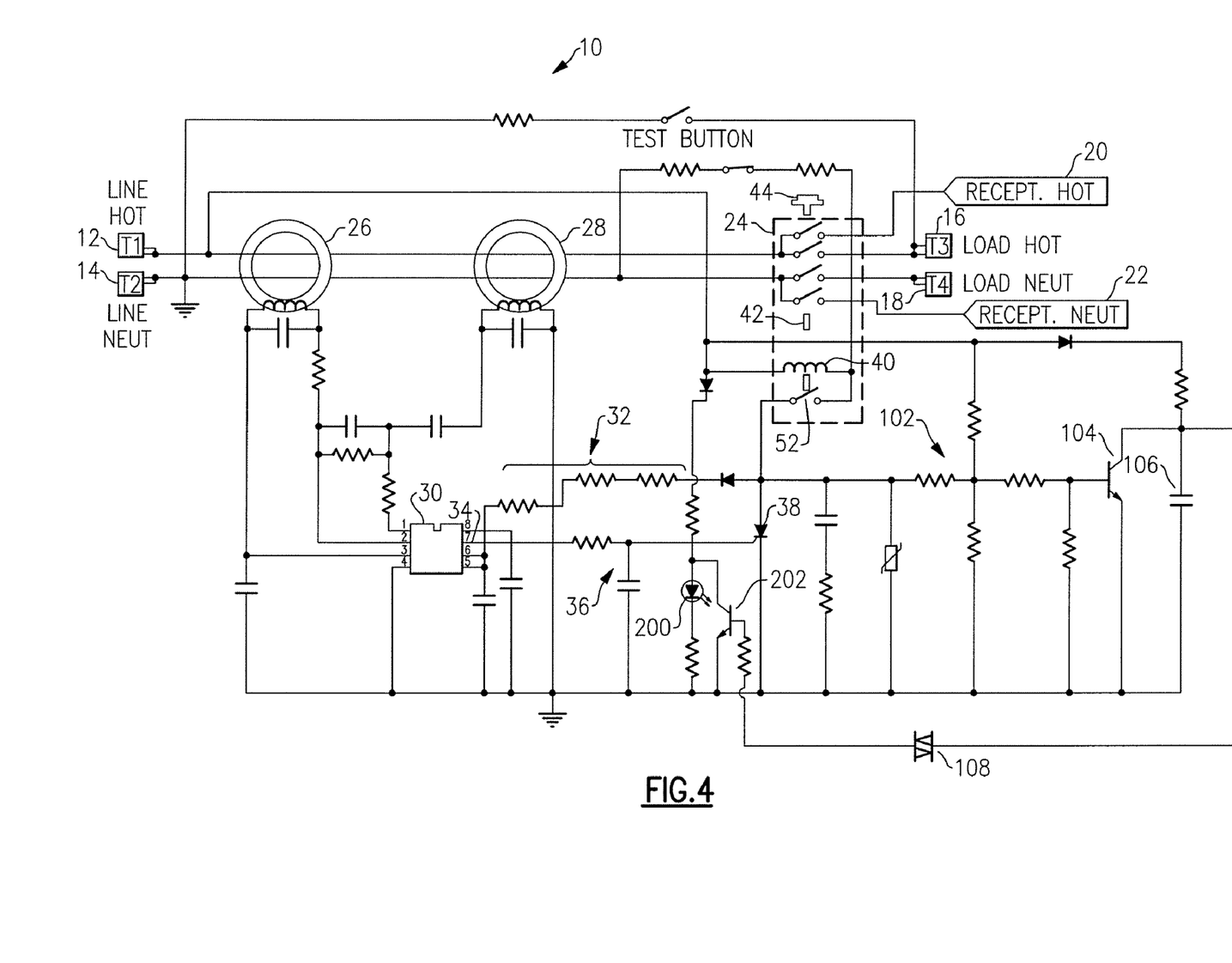
FIG. 4 is a schematic of a circuit protection device in accordance with yet another embodiment of the present invention.

Referring to FIG. 4, a schematic of a circuit protection device 10 in accordance with yet another embodiment of the present invention is disclosed. The schematic in FIG. 4 is similar to FIG. 2 in that the sensing, detection, tripping and auxiliary switch components are similar. The circuit depicted in FIG. 4 also includes a line voltage indicator 200. Line voltage indicator 200 is coupled to the line side of the circuit interrupter 24 and signals the user that the device is connected to AC power. When an end of life condition occurs, actuating reset button 44 does not result in the circuit interrupter 24 remaining reset. However, the output of line voltage indicator 200 changes into periodic end of life signal. Diac 108 periodically conducts a current to periodically turn transistor 2020N. When transistor 202 conducts, line voltage indicator 200 turns OFF.

Figure 5:
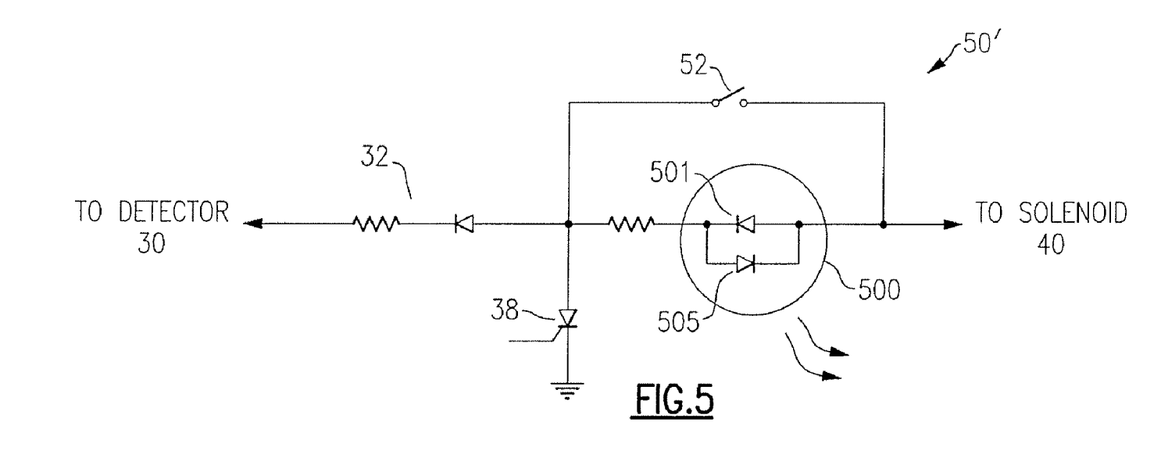
FIG. 5 is a detail view of an alternate indicator circuit for use in the device depicted in FIG. 1.
Figure 6:
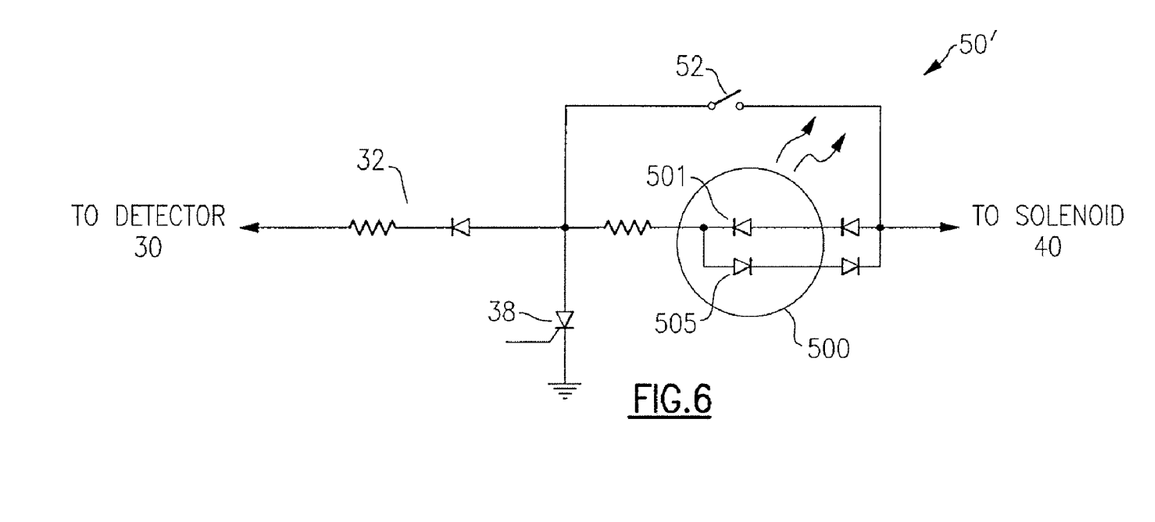
FIG. 6 is a detail view of an alternate indicator circuit for use in the device depicted in FIG. 1.

Referring to FIGS. 5–6, a detail view of an alternate indicator circuit 50' for use in the device depicted in FIG. 1 is shown. Indicator circuit 50' includes two indicators 501, 505 that are configured to emit different colors. Indicator 501 and indicator 505 are disposed in a single indicator housing 500. Indicator 501 is a trip indicator that emits light when auxiliary switch 52 is open (device 10 is tripped.) Indicator 505 is biased to be OFF when device is operational. However, when SCR 38 is in a permanently ON state, indicator 505 is configured to emit light. In this state, indicators 501 and 505 are both energized to emit a visually distinctive combined color. Of course, the combined color indicates that device has reached end of life. For example, one indicator may be red and the other green. When both are energized the colors blend to produce an amber color. The indicators may be red and yellow, in which both are energized the colors blend to produce an orange color. Although the two lamp configuration has been disclosed with respect to the embodiment in FIG. 1, it may be included in other embodiments of the invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A protective device comprising:
   a plurality of line terminals and a plurality of load terminals;
   a fault detection circuit coupled to the plurality of line terminals, the fault detection circuit being configured to provide a detection output signal in response to a detected condition;
   a switching device coupled to the fault detection circuit, the switching device being configured to provide a trip signal in response to the detection output signal, the switching device being characterized by at least one device parameter;
   a circuit interrupting assembly configured to electrically connect the plurality of line terminals and the plurality of load terminals in a reset state and disconnect the plurality of line terminals from the plurality of load terminals in response to the trip signal in a tripped state; and
   an indicator circuit assembly coupled to the switching device, the indicator circuit assembly being configured to generate a user-perceivable output signal based on the at least one device parameter.

2. The device of claim 1, further comprising a protective circuit coupled to the switching device and the circuit interrupting assembly, the protective circuit being configured to de-energize at least a portion of the circuit interrupting assembly in response to the trip signal.

3. The device of claim 1, wherein the switching device is a thyristor.

4. The device of claim 1, wherein the indicator circuit assembly further comprises:
   a monitoring circuit coupled to the switching device, the monitoring circuit being configured to monitor the at least one device parameter and provide an end-of-life signal on the basis of the at least one device parameter; and
   an indicator assembly coupled to the monitoring circuit, the indicator assembly including at least one indicator configured to generate the user-perceivable output signal in response to the end-of-life signal.

5. The device of claim 4, wherein the indicator assembly includes a light emitting visual indicator.

6. The device of claim 4, wherein the indicator assembly includes an audible indicator.

7. The device of claim 4, wherein the at least one indicator includes a plurality of indicators, the plurality of indicators including at least one light emitting indicator and at least one audible indicator.

8. The device of claim 4, wherein the at least one indicator includes a plurality of visually distinct light emitting indicators.

9. The device of claim 4, wherein the at least one indicator includes a pilot light.

10. The device of claim 4, wherein the at least one indicator includes a tripped state indicator.

11. The device of claim 4, wherein the at least one indicator includes a reset state indicator.

12. The device of claim 4, wherein the at least one indicator includes a line voltage indicator.

13. The device of claim 1, wherein the detected condition includes a ground fault condition, an arc fault condition, a grounded neutral condition, a miswire fault condition, and/or a simulated test fault condition.

14. The device of claim 1, wherein the user-perceivable output signal is a periodic signal, the periodic signal being a blinking light if the indicator circuit assembly employs a visual indicator, or a beeping sound if the indicator circuit assembly employs an audible indicator.

15. A protective device comprising:
    a plurality of line terminals and a plurality of load terminals;
    a fault detection circuit coupled to the plurality of line terminals, the fault detection circuit being configured to provide a detection output signal in response to a detected condition;
    a switching device coupled to the fault detection circuit, the switching device being configured to provide a trip signal in response to the detection output signal, the switching device being characterized by at least one device parameter;
    a circuit interrupting assembly configured to electrically connect the plurality of line terminals and the plurality of load terminals in a reset state and disconnect the plurality of line terminals from the plurality of load terminals in response to the trip signal in a tripped state;
    a protective circuit coupled to the switching device and the circuit interrupting assembly, the protective circuit being configured to de-energize at least a portion of the circuit interrupting assembly in response to the trip signal; and
    an indicator circuit assembly coupled to the switching device, the indicator circuit assembly being configured to generate a user-perceivable output signal based on the at least one device parameter.

16. The device of claim 15, wherein the indicator circuit assembly further comprises:
    a monitoring circuit coupled to the switching device, the monitoring circuit being configured to monitor the at least one device parameter and provide an end-of-life signal on the basis of the at least one device parameter; and
    at least one indicator coupled to the monitoring circuit, the indicator being configured to generate the user-perceivable output signal in response to the end-of-life signal.

17. The device of claim 16, wherein the at least one indicator includes a plurality of indicators, the at least one indicator including at least one light emitting visual indicator.

18. The device of claim 17, wherein the plurality of indicators includes at least one audible indicator.

19. The device of claim 17, wherein the plurality of indicators includes a pilot light and/or a tripped state indicator.

20. The device of claim 17, wherein the plurality of indicators includes a reset state indicator.

21. The device of claim 17, wherein the plurality of indicators includes a line voltage indicator.

22. The device of claim 15, wherein the detected condition includes a ground fault condition, an arc fault condition, a grounded neutral condition, a miswire fault condition, and/or a simulated test fault condition.

23. A protective device comprising:
    a plurality of line terminals and a plurality of load terminals;
    a fault detection circuit coupled to the plurality of line terminals, the fault detection circuit being configured to provide a detection output signal in response to a detected condition;
    a switching device coupled to the fault detection circuit, the switching device being configured to provide a trip signal in response to the detection output signal, the switching device being characterized by at least one device parameter;

a circuit interrupting assembly configured to electrically connect the plurality of line terminals and the plurality of load terminals in a reset state and disconnect the plurality of line terminals from the plurality of load terminals in response to the trip signal in a tripped state;

a monitoring circuit coupled to the switching device, the monitoring circuit being configured to monitor the at least one device parameter and provide an end-of-life signal on the basis of the at least one device parameter; and at least one indicator coupled to the monitoring circuit, the indicator being configured to generate the user-perceivable output signal in response to the end-of-life signal.

24. The device of claim 23, further comprising a protective circuit coupled to the switching device and the circuit interrupting assembly, the protective circuit being configured to de-energize at least a portion of the circuit interrupting assembly in response to the trip signal.

25. The device of claim 23, wherein the at least one indicator includes a light emitting visual indicator.

26. The device of claim 23, wherein the at least one indicator includes an audible indicator.

27. The device of claim 23, wherein the at least one indicator includes a plurality of indicators.

28. The device of claim 23, wherein the at least one indicator includes a pilot light, a wiring state indicator, a line voltage indicator, and/or a tripped state indicator.

29. The device of claim 23, wherein the detected condition includes a ground fault condition, an arc fault condition, a grounded neutral condition, a miswire fault condition, and/or a simulated test fault condition.

30. A protective device comprising:
a plurality of line terminals and a plurality of load terminals;

a fault detection circuit coupled to the plurality of line terminals, the fault detection circuit being configured to provide a detection output signal in response to a detected condition;

a switching device coupled to the fault detection circuit, the switching device being configured to provide a trip signal in response to the detection output signal, the switching device being characterized by at least one device parameter;

a circuit interrupting assembly configured to electrically connect the plurality of line terminals and the plurality of load terminals in a reset state and disconnect the plurality of line terminals from the plurality of load terminals in response to the trip signal in a tripped state;

a protective circuit coupled to the switching device and the circuit interrupting assembly, the protective circuit being configured to de-energize at least a portion of the circuit interrupting assembly in response to the trip signal;

a monitoring circuit coupled to the switching device, the monitoring circuit being configured to monitor the at least one device parameter and provide an end-of-life signal on the basis of the at least one device parameter; and at least one indicator coupled to the monitoring circuit, the at least one indicator being configured to generate a user-perceivable periodic output signal in response to the end-of-life signal.

31. The device of claim 30, wherein the at least one indicator includes a plurality of indicators disposed in an integrated assembly.

32. The device of claim 30, wherein the at least one indicator includes a pilot light, a wiring state indicator, a line voltage indicator, and/or a tripped state indicator.

* * * * *